United States Patent
Weddle et al.

(10) Patent No.: US 9,489,048 B2
(45) Date of Patent: Nov. 8, 2016

(54) SYSTEMS AND METHODS FOR OPTICAL TRANSMISSION OF HAPTIC DISPLAY PARAMETERS

(71) Applicant: Immersion Corporation, San Jose, CA (US)

(72) Inventors: Amaya Weddle, San Jose, CA (US); Juan Manuel Cruz-Hernandez, Montreal (CA)

(73) Assignee: IMMERSION CORPORATION, San Jose, CA (US)

( * ) Notice: Subject to any disclaimer, the term of this patent is extended or adjusted under 35 U.S.C. 154(b) by 43 days.

(21) Appl. No.: 14/105,266

(22) Filed: Dec. 13, 2013

(65) Prior Publication Data

US 2015/0169056 A1    Jun. 18, 2015

(51) Int. Cl.
| | |
|---|---|
| *G06F 3/01* | (2006.01) |
| *G06F 3/00* | (2006.01) |
| *G06F 3/0354* | (2013.01) |
| *G06F 3/041* | (2006.01) |
| *H04N 21/8358* | (2011.01) |

(52) U.S. Cl.
CPC ............. *G06F 3/016* (2013.01); *G06F 3/005* (2013.01); *G06F 3/03545* (2013.01); *G06F 3/0414* (2013.01); *G06F 2203/014* (2013.01); *H04N 21/8358* (2013.01)

(58) Field of Classification Search
CPC .. G06F 3/033; G06F 3/0354; G06F 3/03545; G06F 3/0317; G06F 3/03542; G06F 3/0386; G06F 2203/04101; G06F 3/016; G06F 3/005; G06F 3/0414; G06F 2203/014; H04N 21/8358
See application file for complete search history.

(56) References Cited

U.S. PATENT DOCUMENTS

| | | | |
|---|---|---|---|
| 7,511,706 B2 | 3/2009 | Schena | |
| 2010/0160041 A1* | 6/2010 | Grant et al. | 463/31 |
| 2011/0032088 A1* | 2/2011 | Kim | G06F 3/016 340/407.1 |
| 2011/0274310 A1 | 11/2011 | Rhoads | |
| 2012/0028577 A1 | 2/2012 | Rodriguez et al. | |
| 2013/0075482 A1 | 3/2013 | Lapstun et al. | |
| 2013/0113763 A1* | 5/2013 | Nungester et al. | 345/179 |
| 2014/0015750 A1* | 1/2014 | Chen | 345/163 |

FOREIGN PATENT DOCUMENTS

| | | |
|---|---|---|
| CN | 104714687 | 6/2015 |
| JP | 2015115076 | 6/2015 |

OTHER PUBLICATIONS

Tanaka et al., Mobile Torque Display and Haptic Characteristics of Human Palm, In Proceedings of ICAT 2001, Dec. 5-7, Tokyo, Japan.
(Continued)

*Primary Examiner* — Lun-Yi Lao
*Assistant Examiner* — Jarurat Suteerawongsa
(74) *Attorney, Agent, or Firm* — Kilpatrick Townsend & Stockton LLP (57) ABSTRACT

Systems and methods for optical transmission of haptic display parameters are disclosed. One disclosed method includes receiving an image signal from an image sensor, the image signal associated with an image, determining a haptic signal based at least in part on the image signal, generating a haptic effect signal based at least in part on the haptic signal, and transmitting the haptic effect signal to a haptic output device.

23 Claims, 4 Drawing Sheets

(56) References Cited

OTHER PUBLICATIONS

Yano et al., Development of a non-grounded haptic interface using the gyro effect, Proceedings. 11th Symposium on Haptic Interfaces for Virtual Environment and Teleoperator Systems, Haptics 2003.
European Patent Office, Extended Search report, European Application No. EP14196166.4, dated May 6, 2015, 14 pages.
Kim et al., "Haptic Annotation for an Interactive Image Categories and Subject Descriptors", ICUIMC11, Feb. 23, 2011, pp. 1-3, XP055180715.
Suzuki et al., "Mobile interaction using steganographic image on mobile display", Proceedings of the $10^{th}$ International Conference on Human Computer Interaction with Mobile Devices and Services, MOBILEHCI '08, Jan. 2008, p. 507, XP055180251.
European Patent Application No. 14 196 166.4, Office Action dated May 27, 2016.

* cited by examiner

SYSTEMS AND METHODS FOR OPTICAL TRANSMISSION OF HAPTIC DISPLAY PARAMETERS

FIELD

The present disclosure relates generally to systems and methods for optical transmission of haptic display parameters.

BACKGROUND

Touch-enabled devices have become increasingly popular. For instance, peripherals, accessories, and other devices may be configured with haptic output devices so that a user can be provided with haptic sensations to provide information to the user, such as an indication of the occurrence of various events. Such effects may be used, for example to supplant or augment a visual or auditory effect. Such peripherals may receive information for generating haptic effects over a wireless communication channel, such as Bluetooth or Wi-Fi, however, at times such communication channels may introduce latency into the communication and hamper the ability of the peripheral to provide the haptic effect efficiently and effectively. Optical transmission of at least some of the parameters used to generate the effect may help improve the ability of a device to provide haptic effects.

SUMMARY

Embodiments provide systems and methods for optical transmission of haptic display parameters. For example, one disclosed method comprises receiving an image signal from an image sensor, the image signal associated with an image, determining a haptic signal based at least in part on the image signal; generating a haptic effect signal based at least in part on the haptic signal; and transmitting the haptic effect signal to a haptic output device. In another embodiment, a computer-readable medium comprises program code for implementing such a method.

In one embodiment, a device comprises an image sensor configured to generate an image signal associated with an image, a haptic output device configured to receive a haptic effect signal and generate a haptic effect based at least in part on the haptic effect signal, and a processor in communication with the image sensor and the haptic output device. In one such device, the processor is configured to determine a haptic signal based at least in part on the image signal, generate a haptic effect signal based at least in part on the haptic signal, and transmit the haptic effect signal to the haptic output device.

These illustrative embodiments are mentioned not to limit or define the invention, but rather to provide examples to aid understanding thereof. Illustrative embodiments are discussed in the Detailed Description, which provides further description of the invention. Advantages offered by various embodiments of this invention may be further understood by examining this specification.

BRIEF DESCRIPTION OF THE DRAWINGS

The accompanying drawings, which are incorporated into and constitute a part of this specification, illustrate one or more examples of embodiments and, together with the description of example embodiments, serve to explain the principles and implementations of the embodiments.

DETAILED DESCRIPTION

Example embodiments are described herein in the context of systems and methods for optical transmission of haptic display parameters. Those of ordinary skill in the art will realize that the following description is illustrative only and is not intended to be in any way limiting. Other embodiments will readily suggest themselves to such skilled persons having the benefit of this disclosure. Reference will now be made in detail to implementations of example embodiments as illustrated in the accompanying drawings. The same reference indicators will be used throughout the drawings and the following description to refer to the same or like items.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

Illustrative System & Embodiment

Figure 1:
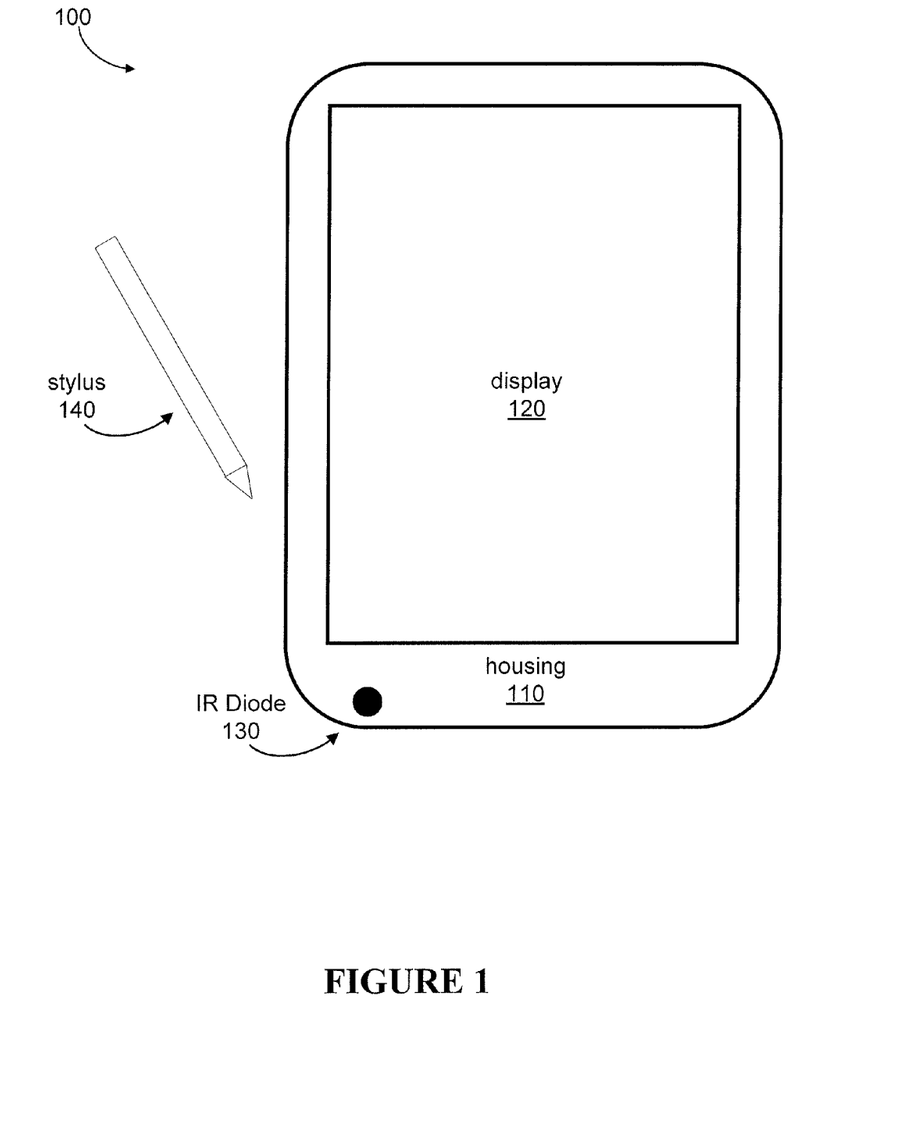
FIG. 1 illustrates an electronic device for optical transmission of haptic display parameters in accordance with an embodiment.

FIG. 1 illustrates an electronic device 100 for optical transmission of haptic display parameters. In the embodiment shown, the electronic device 100 is a tablet. The device 100 includes a housing 110, in which is disposed a display 120 and an IR diode 130. The embodiment shown also includes stylus 140.

The stylus 140 shown is able to detect and process optical display information to generate and play haptic effects in real-time or near real-time. The optical information can be incident to, projected on, or transmitted by a display surface, device, or other light array. The haptic playback in the stylus is initiated via optical transmission from the surface display 120. For example, the stylus 140 an "active" stylus can be created that is able to process optical information via a small embedded camera, and render haptic sensations via a haptic effect generator housed in the stylus. Proprietary optical signatures can be embedded in the display surface, allowing the application developer to control what haptic effects are played in the stylus according to the location, state, and movement of the stylus. In such an embodiment, an end user would feel haptic effects in the stylus 140 that may be modulated based on the speed, location, inclination, etc. of a stylus tip across a display surface, such as a capacitive touchscreen.

Numerous other embodiments are disclosed herein and variations are within the scope of this disclosure. For example, a peripheral or accessory other than a stylus may include an image sensor and be capable of sensing optical haptic parameters. For instance, a handheld scanner may implement the methods described herein to impart information to the user of the scanner. Similarly, a mobile phone that includes a camera may implement methods such as those described herein. These are merely additional examples and are not meant to limit the scope of the present disclosure.

This illustrative example is given to introduce the reader to the general subject matter discussed herein. The invention is not limited to this example. The following sections describe various additional non-limiting embodiments and examples of devices, systems, and methods for parameter modification of haptic effects.

Illustrative Device

Figure 2:
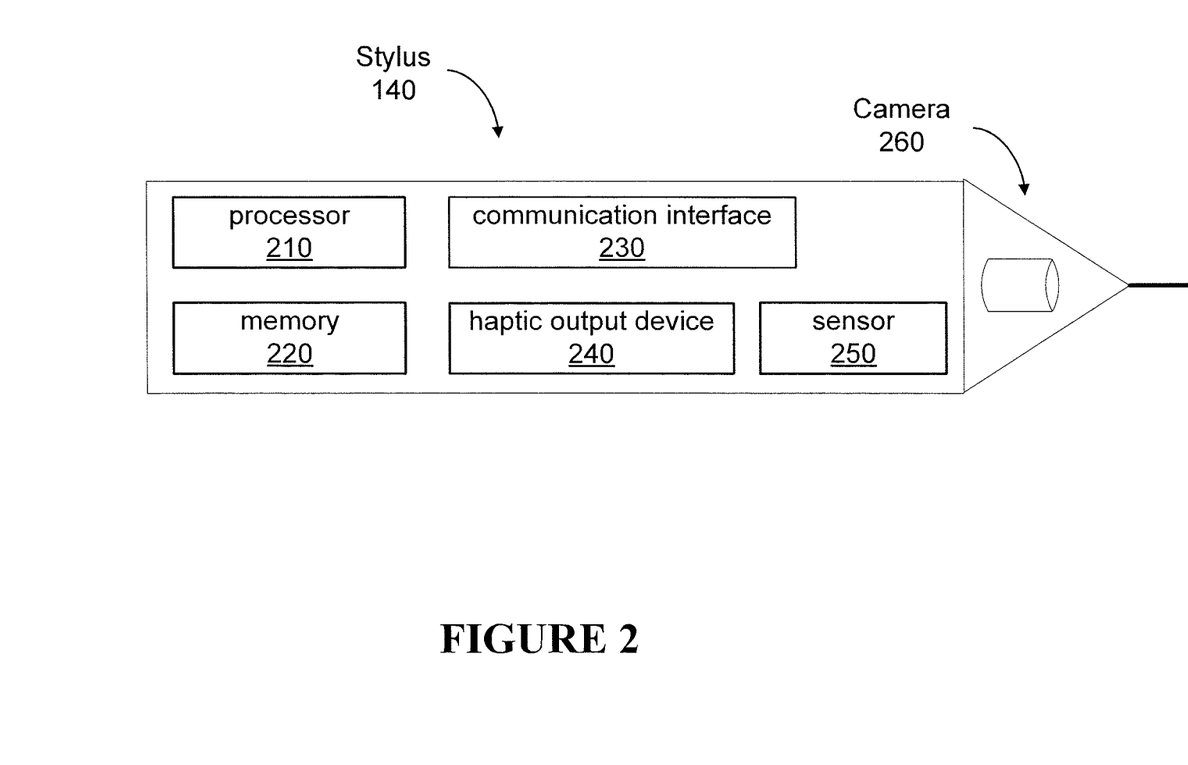
FIG. 2 illustrates an electronic device for optical transmission of haptic display parameters in accordance with an embodiment.

FIG. 2 illustrates a stylus 140 for optical transmission of haptic display parameters according to one embodiment. The stylus 140 includes a processor 210 and memory 220 in communication with the processor 210. The stylus 140 also includes a communication interface 230.

In FIG. 2, the communication interface 230 is in communication with the processor 210 and provides wired or wireless communications from the stylus 140 to other components or other devices. For example, the communication interface 230 may provide wireless communications between the stylus 140 and a wireless sensor or a wireless actuation device. In some embodiments, the communication interface 230 may provide communications to one or more other devices, such as another stylus 140, to allow users to interact with each other at their respective devices. The communication interface 230 can be any component or collection of components that enables the multi-pressure touch-sensitive input stylus 140 to communicate with another component or device. For example, the communication interface 230 may comprise a PCI network adapter, a USB network adapter, or an Ethernet adapter. The communication interface 230 may communicate using wireless Ethernet, including 802.11 a, g, b, or n standards. In one embodiment, the communication interface 230 can communicate using Radio Frequency (RF), Bluetooth, CDMA, TDMA, FDMA, GSM, WiFi, satellite, or other cellular or wireless technology. In other embodiments, the communication interface 230 may communicate through a wired connection and may be in communication with one or more networks, such as Ethernet, token ring, USB, FireWire 1394, fiber optic, etc. In some embodiments, stylus 140 comprises a single communication interface 230. In other embodiments, stylus 140 comprises two, three, four, or more communication interfaces. Thus, in embodiments, stylus 140 can communicate with one or more components and/or devices through one or more communication interfaces. In other embodiments, a stylus 140 may not comprise a communication interface 230.

The stylus 140 shown in FIG. 1 also comprises a haptic output device 240, which can be any component or collection of components capable of outputting one or more haptic effects. For example, a haptic output device can be one of various types including, but not limited to, an eccentric rotational mass (ERM) actuator, a linear resonant actuator (LRA), a piezoelectric actuator, a voice coil actuator, an electro-active polymer (EAP) actuator, a memory shape alloy, a pager, a DC motor, an AC motor, a moving magnet actuator, an E-core actuator, a smartgel, an electrostatic actuator, an electrotactile actuator, a deformable surface, an electrostatic friction (ESF) device, an ultrasonic friction (USF) device, or a thermal actuator for changing the surface temperature, or any other haptic output device or collection of components that perform the functions of a haptic output device or that are capable of outputting a haptic effect. Multiple haptic output devices or different-sized haptic output devices may be used to provide a range of vibrational frequencies, which may be actuated individually or simultaneously. Various embodiments may include a single or multiple haptic output devices and may have the same type or a combination of different types of haptic output devices. In some embodiments, one or more haptic output devices are directly or indirectly in communication with electronic device, such as via wired or wireless communication. In one embodiment, the electronic device can be placed in a vehicle or is integrated into a vehicle and one or more haptic output devices are embedded into the vehicle. For example, the stylus 140 may be used to interact with a display screen mounted in the dashboard of the vehicle. In some embodiments, instead of having haptic output device 240 or in addition to having haptic output device 240, the stylus 140 has one or more other output devices. For example, the stylus 140 may have a speaker and/or a small display. In one embodiment, the stylus 140 has one or more haptic output devices, one or more speakers, and one or more displays. Numerous other embodiments are disclosed herein and variations are within the scope of this disclosure.

In various embodiments, one or more haptic effects may be produced in any number of ways or in a combination of ways. For example, in one embodiment, one or more vibrations may be used to produce a haptic effect, such as by rotating an eccentric mass or by linearly oscillating a mass. In some such embodiments, the haptic effect may be configured to impart a vibration to the entire electronic device or to only one surface or a limited part of the electronic device. In another embodiment, friction between two or more components or friction between at least one component and at least one contact may be used to produce a haptic effect, such as by applying a brake to a moving component, such as to provide resistance to movement of a component or to provide a torque. In order to generate vibration effects, many devices utilize some type of actuator and/or other haptic output device. Known haptic output devices used for this purpose include an electromagnetic actuator such as an Eccentric Rotating Mass ("ERM") in which an eccentric mass is moved by a motor, a Linear Resonant Actuator ("LRA") in which a mass attached to a spring is driven back and forth, or a "smart material" such as piezoelectric, electro-active polymers or shape memory alloys.

In other embodiments, deformation of one or more components can be used to produce a haptic effect. For example, one or more haptic effects may be output to change the shape of a surface or a coefficient of friction of a surface. In an embodiment, one or more haptic effects are produced by creating electrostatic forces and/or ultrasonic forces that are used to change friction on a surface. In other embodiments, an array of transparent deforming elements may be used to produce a haptic effect, such as one or more areas comprising a smartgel. Haptic output devices also broadly include non-mechanical or non-vibratory devices such as those that use electrostatic friction (ESF), ultrasonic surface friction (USF), or those that induce acoustic radiation pressure with an ultrasonic haptic transducer, or those that use a haptic substrate and a flexible or deformable surface, or those that provide projected haptic output such as a puff of air using an air jet, and so on. In some embodiments, a haptic effect is a kinesthetic effect. U.S. patent application Ser. No. 13/092,484 describes ways that one or more haptic effects can be produced and describes various haptic output devices. The entirety of U.S. patent application Ser. No. 13/092,484, filed Apr. 22, 2011, is hereby incorporated by reference.

In FIG. 2, the stylus 140 also comprises a sensor 250 to detect movement of or interaction with the stylus 140, an electronic device, and/or a surface. The sensor 250 is in communication with the processor 210 and provides sensor information to the processor 210. For example, sensor 250 may provide one or more interactions to the processor 210. The sensor 250 may provide an input signal indicating one or more interactions. As another example, sensor 250 can provide information corresponding to one or more interactions with stylus 140 to processor 210. In embodiments, the information the sensor 250 provides to processor 210 corresponds to an interaction with the entire stylus 140, such as a user shaking the stylus 140. In other embodiments, the information sensor 250 provides to processor 210 corresponds to an interaction with a part of the stylus 140, such as the tip of the stylus 140.

The sensor 250 may be utilized to detect one or more of a number of conditions. For example, in one embodiment, the sensor, such as an accelerometer, gyroscope, or compass can detect the inclination of the pen. In another embodiment, the sensor comprises an accelerometer capable of measuring the user's writing speed. Another embodiment uses the camera 260 instead of or in addition to the sensor 250 in order to detect the user's writing speed. In yet another embodiment the sensor 250 detects the pressure of the user's grip on the stylus 140, using, for example, a pressure sensor on the surface of the stylus 140. In yet another embodiment, the sensor 250 detects a pressure exerted by the user on to the writing surface using a pressure sensor on the tip of the pen.

In one embodiment of the present invention, sensor 250 comprises one or more biometric sensors that can be installed on the pen to detect or measure the mood of the user (e.g., relaxed or excited). The input from the biometric sensor can be used to vary the haptic effect. For instance, the haptic feedback may be intensified, such as by increasing the frequency and/or magnitude, if the user is determined to be excited.

The embodiment shown in FIG. 2 depicts a single sensor 250. In some embodiments, multiple sensors can be used. Additionally, a sensor may be housed in the same component as the other components of the stylus 140 or in a separate component. For example, in some embodiments, the processor 210, memory 220, and sensor 250 are all comprised in a stylus 140. In some embodiments, a sensor is placed in a component separate from the portion of the stylus 140 that the user holds. For instance, a wearable sensor may be in communication with the processor 210 and provide information regarding the stylus.

Sensor 250 may comprise any number and/or type of sensing components. For example, sensor 250 can comprise an accelerometer and/or gyroscope. A non-limiting list of examples of sensors and interactions is provided below:

TABLE 1

Exemplary Sensors and Conditions

| Sensor | Interaction Sensed |
| --- | --- |
| Accelerometer | Force in one, two, or three directions |
| Altimeter | Altitude |
| Thermometer | Ambient temperature; user body temperature |
| Heart rate monitor | Heart rate of device user |
| Skin resistance monitor | Skin resistance of device user |

TABLE 1-continued

Exemplary Sensors and Conditions

| Sensor | Interaction Sensed |
| --- | --- |
| Oxygen sensor | Oxygen use of device user |
| Audio sensor/microphone | Ambient audio and/or audio generated by device user |
| Photosensor | Ambient light |
| IR/Photosensor | User eye movement, position, body temperature |
| Hygrometer | Relative humidity |
| Speedometer | Velocity |
| Pedometer/odometer | Distance traveled |
| Chronometer | Time of day, date |
| Weight | Mass or quantity of matter |

The stylus 140 shown in FIG. 2 also comprises a camera 260. The camera 260 is used to "see" the writing surface, for example, a touch screen sensitive device with a collocated visual display (host device), such as is shown in FIG. 1. The pen point of the stylus 140 may comprise a conductive material capable of activating a capacitive touch screen when the user holds the pen on a capacitive sensitive touch screen. In various embodiments, the stylus 140 may be used on a variety of surfaces on which are displayed or printed predefined patterns (e.g. paper, walls, and tables). The stylus 140 is able to recognize these patterns with the camera 260 and corresponding software and/or firmware and produce haptic effects based on the surface optical patterns recognized by the camera 260.

In one embodiment, the camera 260 is used to see the writing surface, which may be a touch sensitive device with a collocated visual display. The pen point in such an embodiment could be made of conductive material to activate a capacitive touch screen when the user holds the pen on a capacitive sensitive touch screen. The same pen can be used on other surfaces with predefined patterns (e.g. paper, walls, and tables) and produce haptic effects based on the surface optical patterns that could be recognized by the camera 260.

In one embodiment, stylus 140 comprises a smart pen. Smart pens are pen-like devices that can record handwriting and audio at the same time for up to several hours. Such pens comprise a camera behind the pen point (cartridge) that looks over a patterned paper to keep track of the information being written or drawn.

As will be clear to one of skill in the art, numerous other embodiments are disclosed herein and variations are within the scope of this disclosure.

Illustrative Method of Parameter Modification of Haptic Effects

Figure 3:
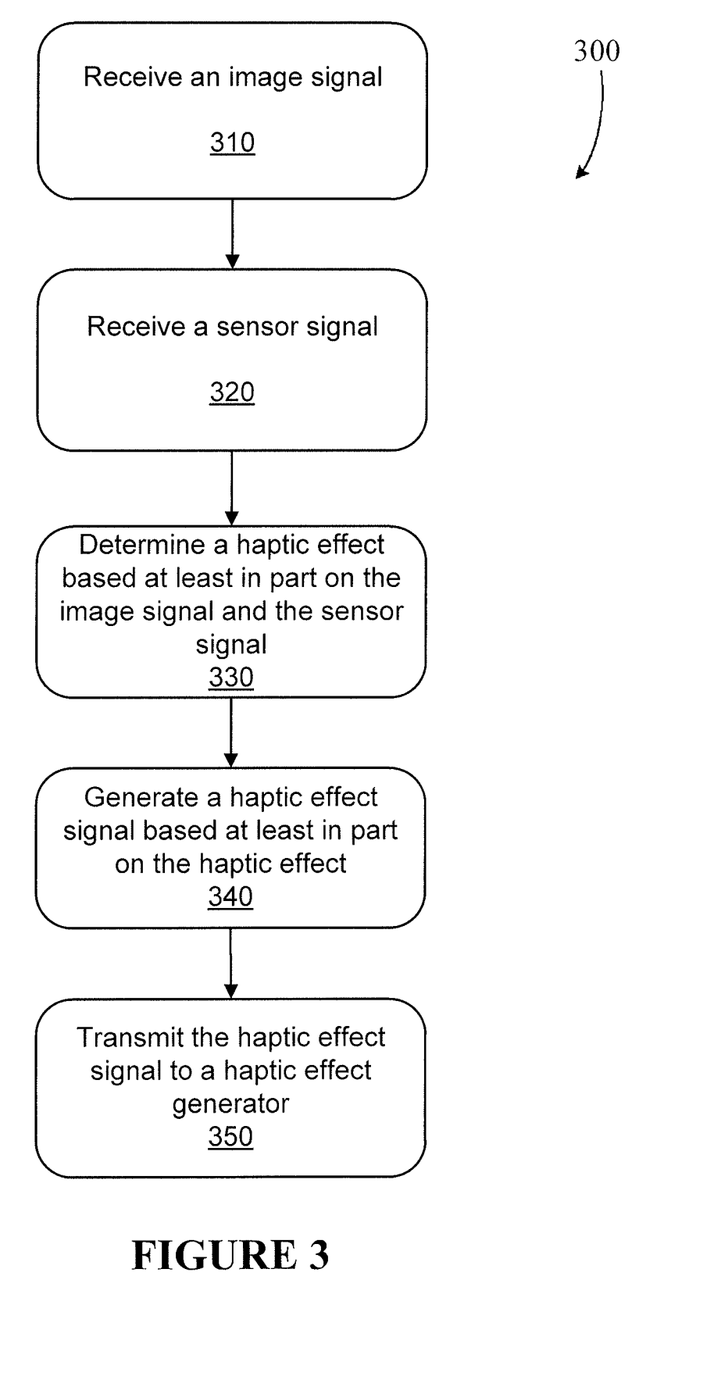
FIG. 3 is a flow chart illustrating a method for optical transmission of haptic display parameters in accordance with an embodiment.

FIG. 3 illustrates a flow chart directed to a method 300 of optical transmission of haptic display parameters in accordance with an embodiment. The method 300 shown in FIG. 3 will be described with respect to stylus 140 shown in FIGS. 1 and 2.

The method 300 begins in block 310 when a first image signal is received via camera 260. For example, as stylus 140 is passed over an image, the camera 260 captures and processes the image and communicates an image signal to the processor 210.

Next in block 320, the processor 210 receives a sensor signal from sensor 250. The sensor signal may indicate, for example, that the stylus 140 is being moved.

The processor 210 next determines a haptic effect based at least in part on the image signal and the sensor signal 330. In some embodiments, the processor 210 relies solely on the image signal.

The processor 210 then generates a haptic effect signal based at least in part on the haptic effect 340. In some embodiments, in addition to the haptic effect, the processor 210 may, for example, take the type or number of haptic output device 240 into account when generating the haptic effect signal.

Finally, the processor 210 transmits the haptic effect signal to the haptic output device 240 in order to output the effect 350. The effect can then be felt by the user as, for example a vibration of the stylus.

In one embodiment, when the device 100 housing the display 120 is turned on, an initial synchronization procedure is executed where initial conditions of the current graphical user interface ("GUI") presented by the device 100 on the display 120 is transmitted to the stylus 140, thus preparing the active stylus with the necessary information to generate haptic effects. In such an embodiment, if the stylus 140 has been far away from the device 100 and the connection is re-established, a synchronization process is executed. The synchronization may include, for example, whether the device 100 is displaying a GUI or a specific application. With this information, the stylus is able to determine what type of effect to generate in response to a detected optical patterns or when drawing something on the display 120.

Figure 4:
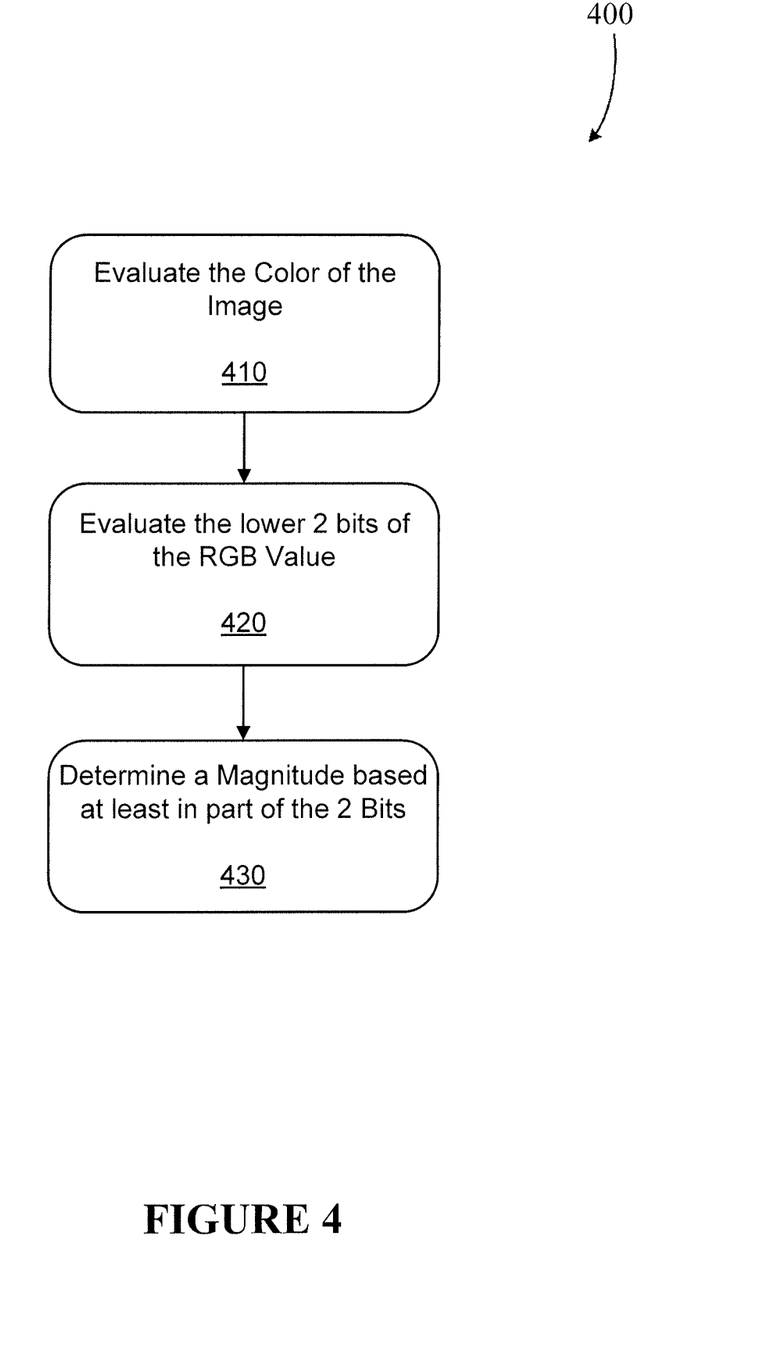
FIG. 4 is a flow chart illustrating a method for evaluating a color signal in a method for optical transmission of haptic display parameters in accordance with an embodiment.

FIG. 4 is a flow chart illustrating a method for evaluating a color signal in a method for optical transmission of haptic display parameters in accordance with an embodiment. The embodiment shown is similar to some steganography techniques used in images. First the processor 210 evaluates the color of an image 410.

The color of the image includes various types of information, including an RGB value. In one embodiment, the processor evaluates the lower 2 bits of the RGB value 320. The processor 210 then determines the magnitude of a haptic effect based at least in part on the lower 2 bits of the RGB value 430.

In another embodiment, the processor 210 utilizes the color and width of the drawing to determine the type of haptic effect to be played and the magnitude to be used, or modulation/texture to be used.

In another embodiment, a region of the display 120 may contain a special pixel pattern or grid. When the camera 260 provides the image signal to the processor 210, the processor 210 can then generate haptic effects that that correspond to "textures" in that region of the display 120, or that are modulated by the speed that the user is making the stylus traverse the region. In yet another embodiment, when one or more buttons are displayed in on the display 120, the haptic information can be encoded in the color patterns displayed at the edges of the icon/button.

In some embodiments, the device 100 may be equipped with an Infrared ("IR") light not visible to the human eye, which is located such that the stylus 140 can detect the IR light when the stylus 140 is in close proximity to the device 100. In some embodiments, the IR light is emitted using a diode LED, but in other embodiments, light generator may be embedded in the visual display.

In such an embodiment, the device 100 may be capable of delivering additional information from the device 100 to the stylus 140 than over some other means, such as Wi-Fi or Bluetooth. In one such embodiment, a pulse-width modulated ("PWM") signal encodes information pertinent to the generation of the haptic effect. In one such embodiment, a complete protocol is utilized to establish an optical communication of the haptic information. For example, the PWM signal could indicate magnitude and texture of a haptic effect in a 16-bit number over a 5-msec time period, which in embodiments is a sufficiently frequent refresh rate to accurately output the haptic information. Note that the haptic loop within the pen will be much faster. In some embodiments, more complex information is transmitted to the stylus 140, depending on the clock used to generate the PWM and the amount of information to be transmitted.

Additional Illustrative Embodiments

In one illustrative embodiment, a user uses an "active" stylus 140 on a touchscreen tablet device 100. The stylus 140 contains a capacitive tip as well as a camera 260, processor 210, and haptic actuator 250. A special optical signature ("grid" or "pattern" within the display surface 120, which may be invisible or difficult to perceive by an end user) could indicate when the stylus 140 is writing on a paper surface, or it is being used to choose a writing implement from a menu. The camera 250 may also detect position information about the stylus angle, and this information might be used to modulate haptic effects being played in the stylus accordingly. The camera may detect information about the stylus' speed on the surface, when the stylus is touching the surface, or not, and all this information may be used to modulate haptic effects displayed to a user. In various embodiments, a user may be provided with different haptic effects depending upon the writing instrument chosen (different vibration frequency or effect strength), paper type chosen, and the speed of writing.

In another embodiment, a user plays a game on a touchscreen device 100 with a stylus 140. The stylus 140 contains a capacitive tip as well as a camera 260, processor 210, and haptic output device 240. When the user touches the display 120 on gaming elements, the device's camera 260 detects optical information that differentiates the elements from the background, for instance, RGB color, intensity, or pixel density. The stylus 140 processes this optical information, and delivers a haptic effect via the actuator. In one example, a user is playing a game where she can pop bubbles with the stylus 140 and feel "pops" as vibrotactile effects in the stylus 140.

In yet another embodiment, a group of users are operating a large tabletop display with multiple styluses in order to draw and annotate a group sketch. The tabletop display device uses FTIR (Frustrated Total Internal Reflection) for touch detection. Each user has a stylus that is capable of reading optical information produced by the display surface, and rendering haptic effects to the hand of the user. Each user is able to write simultaneously and feel effects independently. Such a configuration would be very challenging to accomplish using wireless protocols due to the number of independent devices.

In a further embodiment, a user is playing with a game controller or home entertainment system that uses an IR light array for detecting gesture and movement of the human body. The user can hold a controller unit with an optical sensor that can detect the light array. Detected transitions or signal modulation might trigger the controller to play different haptic effects. The system could detect when the device is pointing at a gaming element onscreen, playing an effect. For example, the user might feel an effect when a virtual bat makes contact with a virtual baseball.

Advantages of Optical Transmission of Haptic Parameters

Latency can be a key usability challenge in device interactions that use wireless communication protocols (e.g.

Bluetooth, Wi-Fi, or NFC) in order to receive transmission signals and display haptic information to the user. For instance, a user operating a stylus with a touchscreen mobile device, where the device sends information wirelessly to the stylus to display haptic information, may encounter latency that negatively impacts usability and performance.

One benefit of using optical transmission of haptic effects is that the haptic device can receive initiating signals in real-time without reliance on wireless communication signals to initiate haptic effect playback. This also may lessen the usability burden of "pairing" the device via handshakes to establish the communication protocol, which can be cumbersome in the case of Bluetooth or Wi-Fi networking connections. Further, an optical-detecting haptic device could be sold as a third party device and used with any display surface or device that is displaying an optical signature that it can recognize.

In one embodiment, application developers are able to embed specific optical information into their application that will provide a user who has an optical-detecting haptic stylus or other device with an enhanced experience. Further, pre-determined optical signatures could be made available to application developers as well as the technology to read them and render haptic effects.

Some devices described herein may deliver haptic output in a way that creates realism and enhances usability by initiating the signal for triggering haptic effects at a host device. The host device then processes the haptic requirements for specific software applications, creates that haptic signal/information, and sends it to the haptic device, lessening the demands on the device providing the haptic feedback. Since this processing requires processing cycles, memory and time, devices that can overcome any restrictions added by limited throughput in wireless communication channel would be advantageous. Further, a haptic device that reads haptic parameters directly from a graphical user interface, displayed as optical information, may almost substantially eliminate the latency inherent in a wireless communication channel, allowing the haptic effect to be generated such that it feels almost immediate to a user.

General

While the methods and systems herein are described in terms of software executing on various machines, the methods and systems may also be implemented as specifically-configured hardware, such as field-programmable gate array (FPGA) specifically configured to execute the various methods. For example, embodiments can be implemented in digital electronic circuitry, or in computer hardware, firmware, software, or in a combination thereof. In one embodiment, a device may comprise a processor or processors. The processor comprises a computer-readable medium, such as a random access memory (RAM) coupled to the processor. The processor executes computer-executable program instructions stored in memory, such as executing one or more computer programs for editing an image. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example computer-readable media, that may store instructions that, when executed by the processor, can cause the processor to perform the steps described herein as carried out, or assisted, by a processor. Embodiments of computer-readable media may comprise, but are not limited to, an electronic, optical, magnetic, or other storage device capable of providing a processor, such as the processor in a web server, with computer-readable instructions. Other examples of media comprise, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code for carrying out one or more of the methods (or parts of methods) described herein.

The foregoing description of some embodiments of the invention has been presented only for the purpose of illustration and description and is not intended to be exhaustive or to limit the invention to the precise forms disclosed. Numerous modifications and adaptations thereof will be apparent to those skilled in the art without departing from the spirit and scope of the invention.

Reference herein to "one embodiment" or "an embodiment" means that a particular feature, structure, operation, or other characteristic described in connection with the embodiment may be included in at least one implementation of the invention. The invention is not restricted to the particular embodiments described as such. The appearance of the phrase "in one embodiment" or "in an embodiment" in various places in the specification does not necessarily refer to the same embodiment. Any particular feature, structure, operation, or other characteristic described in this specification in relation to "one embodiment" may be combined with other features, structures, operations, or other characteristics described in respect of any other embodiment.

That which is claimed is:

1. A method comprising:
  receiving an image signal from an image sensor, the image signal corresponding to an image comprising encoded data;
  extracting a haptic type and a haptic magnitude specified in the encoded data: determining a haptic signal based at least in part on the haptic type and the haptic magnitude by at least evaluating a lower 2 bits of an RGB value to determine the haptic magnitude of a haptic effect;
  generating a haptic effect signal configured to cause the haptic effect of the haptic type at the haptic magnitude based at least in part on the haptic signal; and transmitting the haptic effect signal to a haptic output device.

2. The method of claim 1, wherein determining the haptic signal comprises evaluating a color of the image.

3. The method of claim 1, wherein determining the haptic signal comprises determining a width of a drawing in the image.

4. The method of claim 1, wherein determining the haptic signal further comprises extracting a modulation and a texture specified in the encoded data.

5. The method of claim 1, further comprising receiving a sensor signal from a sensor and wherein the haptic signal is determined based at least in part on the sensor signal.

6. The method of claim 5, wherein the sensor comprises one of an accelerometer, gyroscope, compass, biosensor, or pressure sensor.

7. The method of claim 5, wherein the sensor signal is associated with a user's writing speed.

8. The method of claim 5, wherein the sensor signal is associated with a pressure applied to the sensor by a user.

9. The method of claim 5, wherein the sensor signal is associated with a pressure applied to the image.

10. The method of claim 1, wherein the image sensor and haptic output device are contained within a stylus.

11. The method of claim 1, wherein the haptic output device comprises one or more of a vibrotactile actuator, deforming actuator, or thermal actuator.

12. The method of claim 1, wherein the encoded data comprises a pulse-width modulated encoded haptic parameter.

13. A non-transitory computer-readable medium comprising executable program code configured to cause a processor to: one or more software programs configured to be executed by a processor, the one or more software applications configured to: receive an image signal from an image sensor, the image signal corresponding to an image and comprising encoded data;
    extract a haptic type and a haptic magnitude specified in the encoded data; determine a haptic signal based at least in part on the haptic type and the haptic magnitude by at least evaluating a lower 2 bits of an RGB value to determine the haptic magnitude of a haptic effect;
    generate a haptic effect signal configured to cause the haptic effect of the haptic type at the haptic magnitude based at least in part on the haptic signal; and transmit the haptic effect signal to a haptic output device.

14. The non-transitory computer-readable medium of claim 13, wherein the one or more software applications is further configured to cause the processor to evaluate a color of the image to determine the haptic signal.

15. An input device, comprising:
    an image sensor configured to generate an image signal corresponding to an image comprising encoded data;
    a haptic output device configured to receive a haptic effect signal and generate a haptic effect based at least in part on the haptic effect signal; and
    a processor in communication with the image sensor and the haptic output device, the processor configured to:
    receive the image signal from the image sensor, the image signal comprising the encoded data;
    extract a haptic type and a haptic magnitude specified in the encoded data: determine a haptic signal based at least in part on the haptic type and the haptic magnitude by at least evaluating a lower 2 bits of an RGB value to determine the haptic magnitude of a haptic effect;
    generate a haptic effect signal configured to cause the haptic effect of the haptic type at the haptic magnitude based at least in part on the haptic signal; and transmit the haptic effect signal to the haptic output device.

16. The input device of claim 15, further comprising a receiver for detecting light from a light emitter.

17. The input device of claim 16, wherein the light emitter comprise an infrared (IR) emitter.

18. The input device of claim 15, further comprising a sensor, wherein the sensor comprises one of an accelerometer, gyroscope, compass, biosensor, or pressure sensor.

19. The input device of claim 15, wherein the haptic output device comprises one or more of a vibrotactile actuator, deforming actuator, or thermal actuator.

20. The input device of claim 15, wherein the input device comprises a stylus.

21. The input device of claim 20, wherein the encoded data comprises one or more optical signatures that control what haptic effects are played based at least in part on a location, state, and a movement of the stylus.

22. The input device of claim 20, wherein the haptic effect signal is modulated based on a speed, a location, and an inclination of the stylus across a display surface.

23. The input device of claim 15, wherein the input device receives initiating signals in real-time without reliance on wireless communication signals to initiate haptic effect playback.

* * * * *